(12) United States Patent
Wang et al.

(10) Patent No.: US 12,299,897 B2
(45) Date of Patent: May 13, 2025

(54) VIRTUAL REALITY SYSTEM, CONTROL METHOD, AND NON-TRANSITORY COMPUTER READABLE STORAGE MEDIUM

(71) Applicant: HTC Corporation, Taoyuan (TW)

(72) Inventors: Kuan-Hsun Wang, Taoyuan (TW); Jun-Rei Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 372 days.

(21) Appl. No.: 17/662,654

(22) Filed: May 9, 2022

(65) Prior Publication Data

US 2023/0360226 A1 Nov. 9, 2023

(51) Int. Cl.
*G06T 7/20* (2017.01)
*G02B 27/01* (2006.01)
(Continued)

(52) U.S. Cl.
CPC .............. *G06T 7/20* (2013.01); *G02B 27/017* (2013.01); *G06F 3/011* (2013.01); *G06T 7/70* (2017.01);
(Continued)

(58) Field of Classification Search
CPC .......... G06T 7/20; G06T 7/70; G06T 19/006; G06T 2207/10028; G06T 2207/20084; G06T 2207/30196; G06T 7/246; G06T 2207/20081; G02B 27/017; G06F 3/011; G06F 1/163; G06V 10/62; G06V 10/82; G06V 20/20; G06V 40/10
(Continued)

(56) References Cited

U.S. PATENT DOCUMENTS 9,508,146 B2 * 11/2016 Davies ...................... G06T 7/80
10,970,849 B2 4/2021 Öztireli et al.

FOREIGN PATENT DOCUMENTS

CN 1956692 A 5/2007
CN 104461018 B 5/2017
(Continued)

OTHER PUBLICATIONS

Cha, Towards Fully Mobile 3D Face, Body, and Environment Capture Using Only Head-worn Cameras, IEEE Transactions on Visualization and Computer Graphics, vol. 24, No. 11, Nov. 2018 (Year: 2018).*

(Continued)

*Primary Examiner* — Vu Le
*Assistant Examiner* — Lei Zhao
(74) *Attorney, Agent, or Firm* — CKC & Partners Co., LLC

(57) ABSTRACT

A virtual reality system includes a head-mounted display device and several tracking devices is disclosed. Each tracking devices includes a camera and a processor. The camera obtains a picture of a human body of a current time point. The processor is configured to: obtain a current predicted 3D pose and a confidence of the current time point according to the picture; determine a previous valid value according to a previous predicted 3D pose and a previous final optimized pose; determine a current valid value according to the previous valid value, the confidence, and the current predicted 3D pose; and output the current predicted 3D pose and the confidence to a main tracking device of the tracking devices according to the current valid value, so as to generate a current final optimized pose.

20 Claims, 5 Drawing Sheets

(51) Int. Cl.
  *G06F 3/01* (2006.01)
  *G06T 7/70* (2017.01)
  *G06T 19/00* (2011.01)
  *G06V 10/62* (2022.01)
  *G06V 10/82* (2022.01)
  *G06V 20/20* (2022.01)
  *G06V 40/10* (2022.01)

(52) U.S. Cl.
  CPC ............ *G06T 19/006* (2013.01); *G06V 10/62* (2022.01); *G06V 10/82* (2022.01); *G06V 20/20* (2022.01); *G06V 40/10* (2022.01); *G06T 2207/10028* (2013.01); *G06T 2207/20084* (2013.01); *G06T 2207/30196* (2013.01)

(58) Field of Classification Search
  USPC ....................................... 348/42, 48, 53, 121
  See application file for complete search history.

(56) References Cited

FOREIGN PATENT DOCUMENTS

| | | |
|---|---|---|
| TW | 202014851 A | 4/2020 |
| WO | 2020/038720 A1 | 2/2020 |
| WO | WO-2022191140 A1 * | 9/2022 |

OTHER PUBLICATIONS

Corresponding Taiwan office action issued on Feb. 24, 2023.

* cited by examiner

VIRTUAL REALITY SYSTEM, CONTROL METHOD, AND NON-TRANSITORY COMPUTER READABLE STORAGE MEDIUM

BACKGROUND

Field of Invention

The present application relates to a virtual reality system, a control method, and a non-transitory computer readable storage medium. More particularly, the present application relates to a virtual reality system, a control method, and a non-transitory computer readable storage medium for body tracking.

Description of Related Art

In the current virtual reality (VR) environment, several tracking devices are used to track the human body pose in the VR environment. However, the tracking devices often lack the ability to communicate and integrate with each other. In addition, when the human body is occluded or the field of view is poor, the predicted result of the human body pose is errored. Therefore, a method for optimizing the human body pose prediction for multiple body tracking devices in a VR environment is in need.

SUMMARY

The disclosure provides a virtual reality system. The virtual reality system includes a head-mounted display device and several tracking devices. The tracking devices communicate with the head-mounted display. Each of several tracking devices includes a camera and a processor. The camera is configured to obtain a picture of a human body of a current time point, in which the human body comprises several body parts. The processor is coupled to the camera. The processor is configured to: obtain a current predicted 3D pose of the human body of the current time point and a confidence of the current time point of the human body according to the picture; determine a previous valid value of the human body according to a previous predicted 3D pose of the human body of a previous time point and a previous final optimized pose of the human body of the previous time point; determine a current valid value of the human body according to the previous valid value, the confidence of the current time point, and the current predicted 3D pose of the current time point; and output the current predicted 3D pose of the current time point and the confidence of the current time point of the human body to a main tracking device of several tracking devices according to the current valid value, so as to generate a current final optimized pose of the current time point for the head-mounted display device to display the current final optimized pose of the current time point.

The disclosure provides a control method. The control method is suitable for a virtual reality system including a head-mounted display device and several tracking devices, and each of several tracking devices includes a camera and a processor. The control method includes the following operations: obtaining a current predicted 3D pose of the human body of the current time point and a confidence of the current time point of the human body according to the picture by the processor; determining a previous valid value of the human body according to a previous predicted 3D pose of the human body of a previous time point and a previous final optimized pose of the human body of the previous time point by the processor; determining a current valid value of the human body according to the previous valid value, the confidence of the current time point, and the current predicted 3D pose of the current time point by the processor; and outputting the current predicted 3D pose of the current time point and the confidence of the current time point of the human body to a main tracking device of several tracking devices by the processor according to the current valid value, so as to generate a current final optimized pose of the current time point for the head-mounted display device to display the current final optimized pose of the current time point.

The disclosure provides a non-transitory computer readable storage medium with a computer program to execute aforesaid control method.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
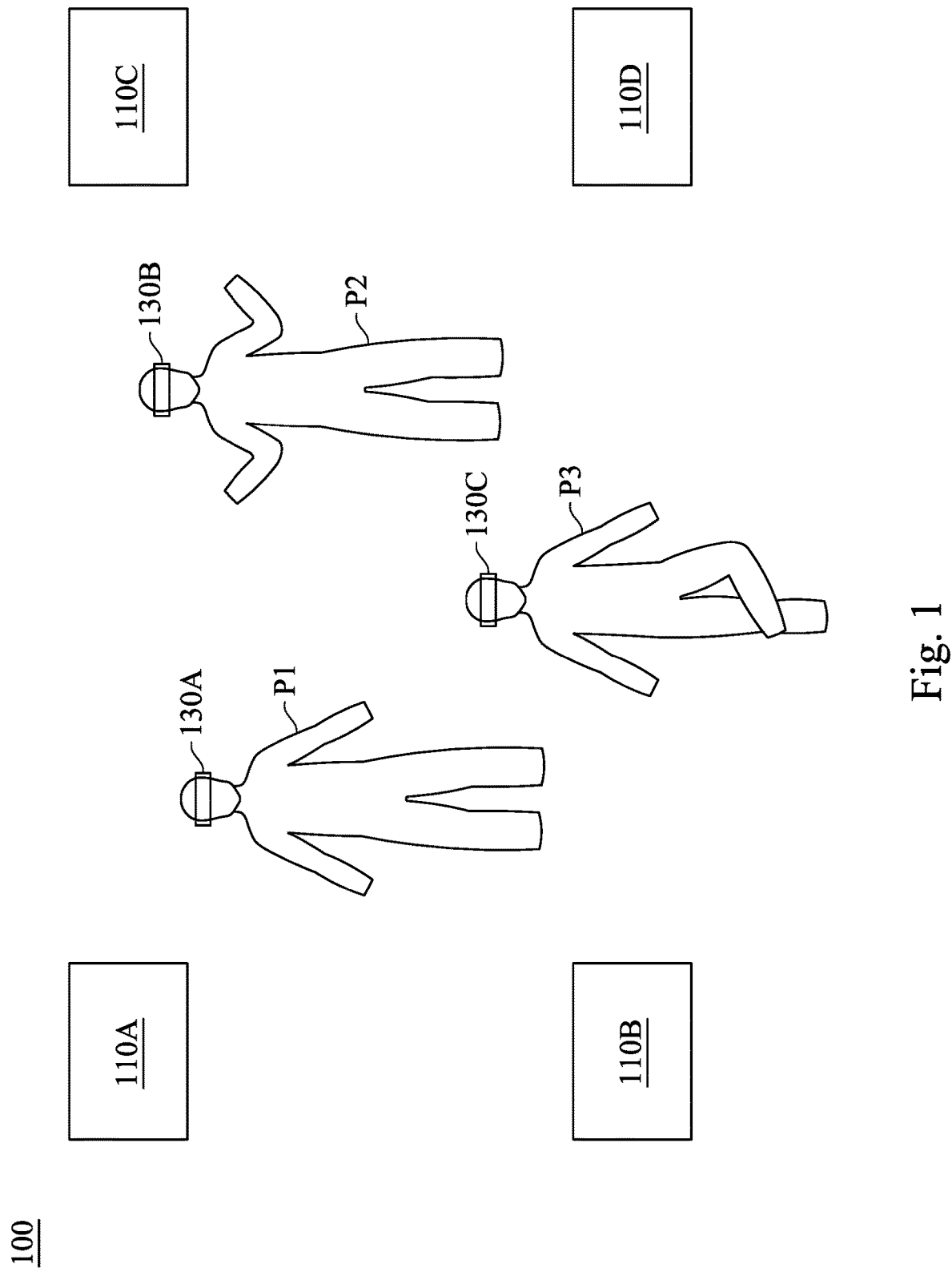
FIG. 1 is a schematic diagram illustrating a virtual reality (VR) system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a virtual reality (VR) system 100 according to some embodiments of the present disclosure. As shown in FIG. 1, the virtual reality system 100 includes several head-mounted display devices (HMD) 130A to 130C and several tracking devices 110A to 110D. The head-mounted display devices 130A to 130C can be disposed on a VR headset, which is wearable on a user. When a user wears the VR headset, the head-mounted display devices 130A to 130C will cover visions of the user, and the head-mounted display devices 130A to 130C are configured to provide virtual reality visions to the user. As illustrated in FIG. 1, each of the users P1 to P3 wears one of the head-mounted display devices 130A to 130C.

In some embodiments, one of the tracking devices 110A to 110D is the main tracking device. For example, if the tracking device 110A is the main tracking device. The main tracking device 110A is communicatively connected to the other tracking devices 110B to 110D, and the main tracking device 110A is also communicatively connected to the head-mounted display devices 130A to 130C. Furthermore, if the tracking device 110A is the main tracking device, the processor 114A is the main processor, and the memory 116A is the main memory.

Figure 2:
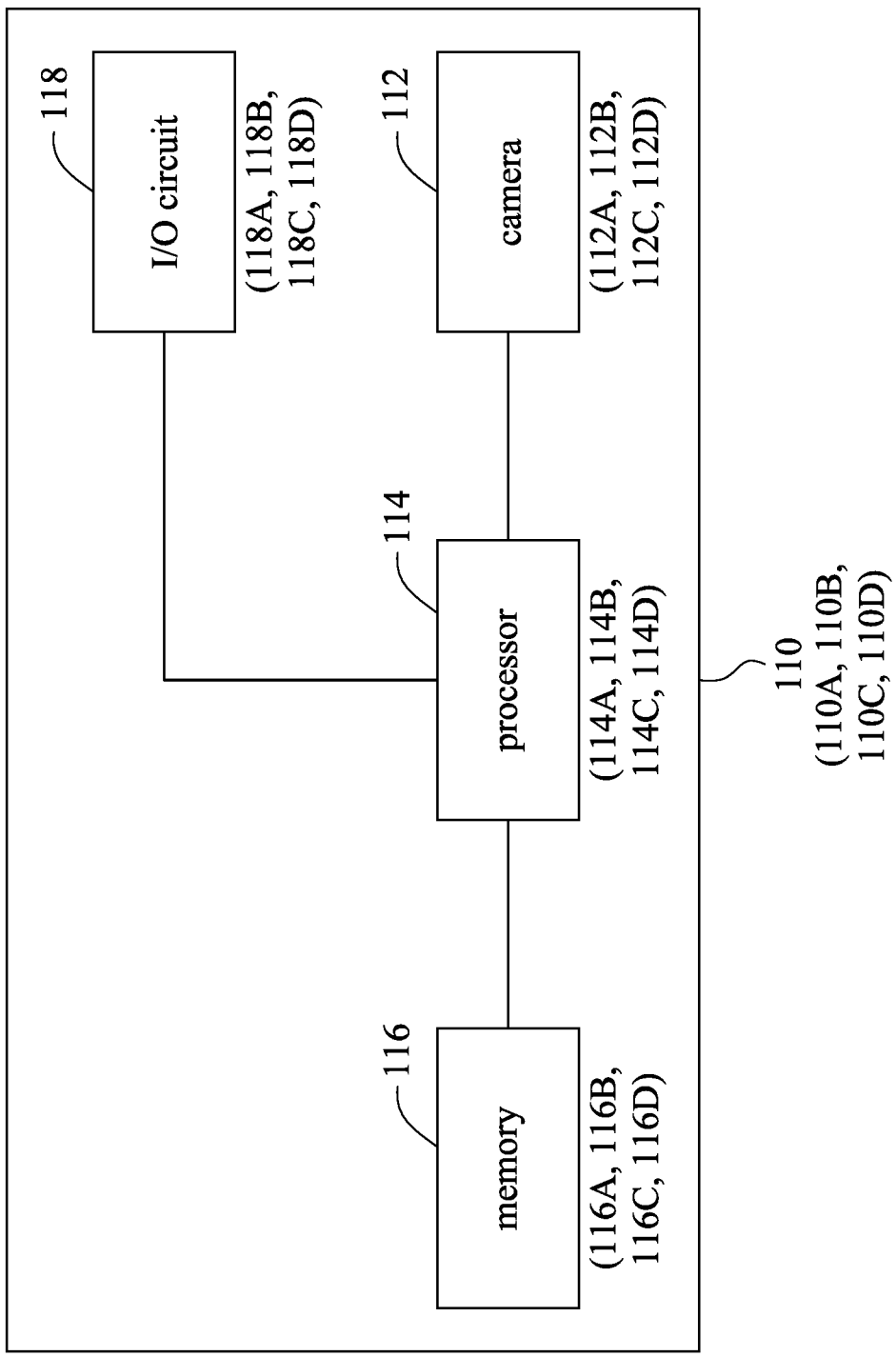
FIG. 2 is a schematic diagram illustrating a tracking device according to some embodiments of the present disclosure.

Reference is made to FIG. 2. FIG. 2 is a schematic diagram illustrating a tracking device 110 according to some embodiments of the present disclosure. The tracking device 110 illustrated in FIG. 2 represents the tracking devices 110A to 110D as illustrated in FIG. 1. As illustrated in FIG. 2. The tracking device 110 includes a camera 112, a processor 114, a memory 116 and an I/O circuit 118. In the connection relationship, the processor 114 couples to the camera 112, the memory 116 and the I/O circuit 118. Similarly, the tracking device 110A includes a camera 112A, a processor 114A, a memory 116A and an I/O circuit 118A. The tracking device 110B includes a camera 112B, a processor 114B, a memory 116B and an I/O circuit 118B. The tracking device 110C includes a camera 112C, a processor 114C, a memory 116C and an I/O circuit 118C. The tracking device 110D includes a camera 112D, a processor 114D, a memory 116D and an I/O circuit 118D. The connection relationships between the elements are the same as those of the tracking device 110 as illustrated in FIG. 2. In some embodiments, when the tracking device 110A is the main tracking device, the processor 114A is the main tracking device.

The tracking devices 110A to 110D send or receive information or signals from other tracking devices 110A to 110D through the I/O circuits 118A to 118D.

Figure 3:
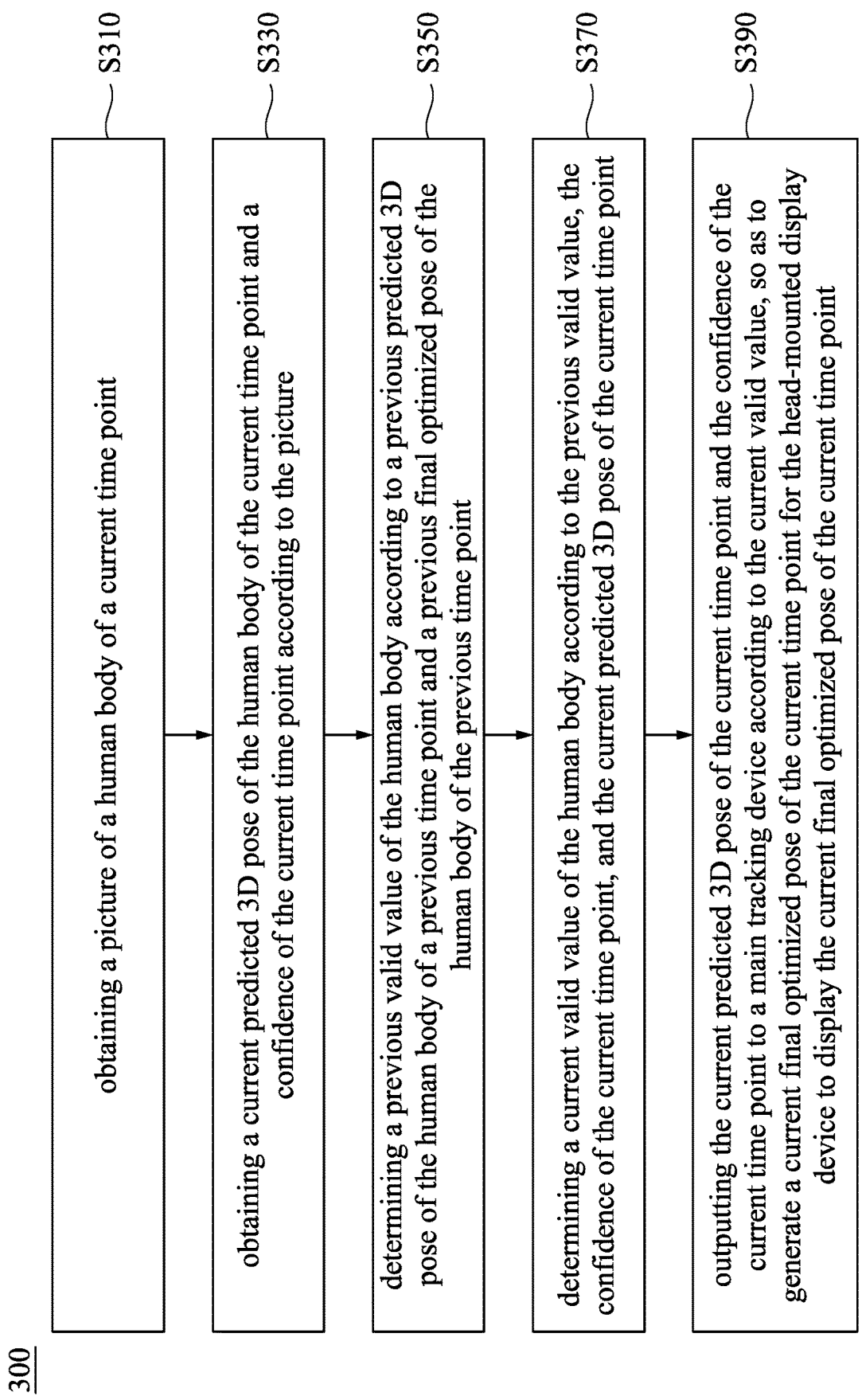
FIG. 3 is a flow chart diagram illustrating a control method according to some embodiments of the present disclosure.

Reference is made to FIG. 3. FIG. 3 is a flow chart diagram illustrating a control method 300 according to some embodiments of the present disclosure. The control method 300 is suitable to be executed by the virtual reality system 100 in FIG. 1. The control method 300 includes operations S310 to S390 for obtaining an optimized 3D human body pose with several tracking devices and displaying the optimized 3D human body pose on the head-mount devices.

In operation S310, a picture of a human body of a current time point is obtained. In some embodiments, operation S310 is operated by the camera 112 as illustrated in FIG. 2.

Figure 4:
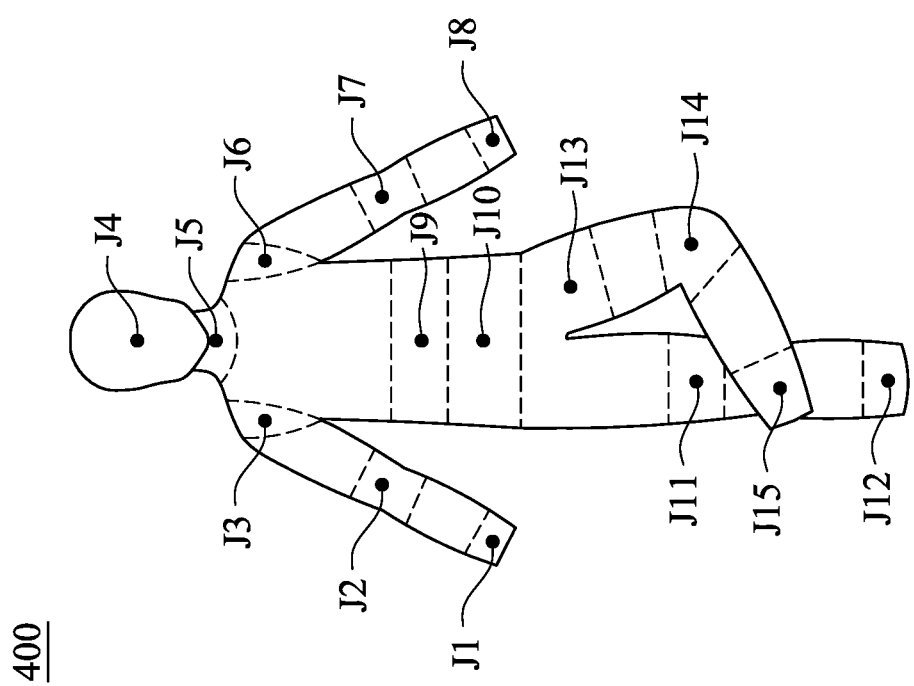
FIG. 4 is a schematic diagram illustrating a picture of the human body at the current time point according to some embodiments of the present disclosure.

Reference is also made to FIG. 4. FIG. 4 is a schematic diagram illustrating a picture 400 of the human body P3 at time point T1 (which is taken as the current time point) captured by the tracking device 110D as illustrated in FIG. 1. In some embodiments, as illustrated in FIG. 4, the human body P3 includes several body parts J1 to J15. In some embodiments, the body parts are the joint points of the human body. The number and the positions of the body parts J1 to J15 as illustrated in FIG. 4 are for illustrative purposes only, and the embodiments of the present disclosure are not limited thereto.

Reference is made to FIG. 2 again. In operation S330, a current predicted 3D pose of the human body of the current time point and a confidence of the current time point are obtained according to the picture. In some embodiments, operation S330 is operated by the processor 114 as illustrated in FIG. 2.

Figure 5:
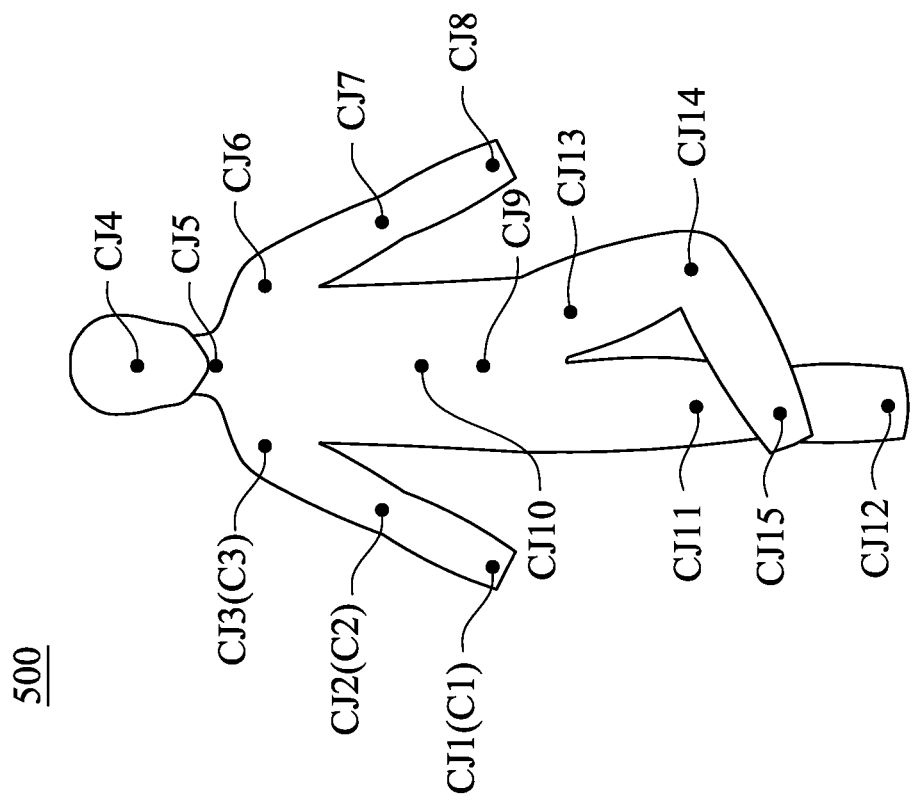
FIG. 5 is a schematic diagram illustrating a predicted 3D pose of the current time point T1 according to the picture as illustrated in FIG. 4.

Reference is made to FIG. 5. FIG. 5 is a schematic diagram illustrating a current predicted 3D pose 500 of the human body P3 of the time point T1 according to the picture 400 as illustrated in FIG. 4.

Taking the situation of the body parts representing the body parts for an example. As illustrated in FIG. 5, the current predicted 3D pose 500 of the human body includes several corresponding current predicted 3D pose CJ1 to CJ15. In detail, the corresponding current predicted 3D pose CJ1 corresponds to the body part J1 as illustrated in FIG. 4, the corresponding current predicted 3D pose CJ2 corresponds to the body part J2 as illustrated in FIG. 4, and so on.

The confidence includes several confidence embedding (or confidence values), and each of the body parts J1 to J15 as illustrated in FIG. 4 corresponds to a confidence embedding. For example, the body part J1 corresponds to the confidence embedding C1, the body part V2 corresponds to the confidence embedding C2, and the body part V3 corresponds to the confidence embedding C3.

In some embodiments, each of the corresponding current predicted 3D pose CJ1 to CJ15 corresponds to a coordinate point in a 3D space.

In some embodiments, the confidence and the confidence embedding are generated according to the visibility and the credibility of the corresponding body parts. In some embodiments, the visibility and the credibility are influenced by whether the body parts are blocked, the distance between the human body and the tracking device, whether the noise exists, or the clarity of the picture.

In some embodiments, the memory 116 in FIG. 2 stores a pose estimation network. In some embodiments, the pose estimation network is an artificial neural network, which is a computing system or algorithm. Various neural network algorithms may be applied to the pose estimation network in the embodiments of the present disclosure.

In some embodiments, the processor 114 in FIG. 2 further inputs the picture 400 as illustrated in FIG. 4 into the pose estimation network to generate the current predicted 3D pose as illustrated in FIG. 5 of time point T1 and the confidence of the time point T1.

Reference is made to FIG. 3 again. In operation S350, a previous valid value of the human body is determined according to a previous predicted 3D pose of the human body of a previous time point and a previous final optimized pose of the human body of the previous time point. In some embodiments, the operation S350 is performed by the processor 114 as illustrated in FIG. 2.

In some embodiments, the previous predicted 3D pose of the time point T0, which is taken as the previous time point of the current time point T1, is stored in the memory 116 as illustrated in FIG. 2. In some embodiments, the previous final optimized pose of the time point T0 is also stored in the memory 116.

In some embodiments, the previous predicted 3D pose of the time point T0 includes several corresponding previous predicted 3D poses, and each of several corresponding previous predicted 3D poses corresponds to the corresponding one of the body parts J1 to J15 as illustrated in FIG. 4.

In some embodiments, the previous final optimized pose of the time point T0 includes several corresponding previous final optimized poses, and each of several corresponding previous final optimized poses corresponds to the corresponding one of the body parts J1 to J15 as illustrated in FIG. 4.

In some embodiments, for each of the body parts J1 to J15 as illustrated in FIG. 4, a previous sub valid value of the time point T0 is determined according to a mean square error between the corresponding previous predicted 3D pose of the time point T0 and the corresponding previous final optimized pose of the time point T0 by the processor 114 as illustrated in FIG. 2.

Reference is made to FIG. 4 together. For example, the previous sub valid value of the body part J1 of the time point T0 is obtained according to the corresponding previous predicted 3D pose of the time point T0 corresponding to the body part J1 and the corresponding previous final optimized pose of the time point T0 corresponding to the body part J1. Other previous sub valid values of the body parts J2 to J15 of the time point T0 are obtained in the same way.

Reference is made to FIG. 3 again. In operation S370, a current valid value of the human body is determined according to the previous valid value, the confidence of the current time point, and the current predicted 3D pose of the current time point. In some embodiments, operation S370 is performed by the processor 114 as illustrated in FIG. 2.

In some embodiments, for each of the body parts J1 to J15 as illustrated in FIG. 4, a current sub valid value of the time point T0 is determined according to the previous sub valid value, the confidence embedding, and the corresponding current predicted 3D pose.

For example, reference is made to FIG. 4 and FIG. 5 together. If the current time point is time point T1 and the previous time point is time T0, for the body part J1 as illustrated in FIG. 4, the current sub valid value of the body part J1 of the time point T1 is obtained according to the previous sub valid value of the body part J1 of the time point T0, the confidence embedding C1 of the body part J1 of the time point T1, and the corresponding current predicted 3D pose CJ1 of the body part J1 of the time point T1. The other current sub valid values corresponding to the other body parts are obtained similarly.

In some embodiments, the memory 116 in FIG. 2 stores a validate network. The processor 114 in FIG. 2 inputs the previous valid value of the time point T0, the confidence of the current time point T1, and the current predicted 3D pose of the time point T1 into the validate network to generate the current valid value of the time point T1. Similarly, the processor 114 in FIG. 2 inputs the previous sub valid value of the time point T0, the confidence embedding of the current time point T1, and the corresponding current predicted 3D pose of the time point T1 into the validate network to generate the current sub valid value of the time point T1.

In some embodiments, the validate network is an artificial neural network, which is a computing system or algorithm. Various neural network algorithms may be applied to the validate network. The embodiments of the present disclosure are not limited thereto.

Reference is made to FIG. 3 again. In operation S390, the current predicted 3D pose of the current time point and the confidence of the current time point are outputted to a main tracking device according to the current valid value, so as to generate a current final optimized pose of the current time point for the head-mounted display device to display the current final optimized pose of the current time point. In some embodiments, operation S390 is performed by the processor 114 as illustrated in FIG. 2.

In some embodiments, in operation S390, the processor 114 as illustrated in FIG. 2 determines whether each of the several body parts is valid according to the current sub valid values of the several body parts.

In some embodiments, the processor 114 as illustrated in FIG. 2 determines whether the current sub valid value of the current time point is higher than a threshold valid value. For example, if the current sub valid value of the body part J1 of the current time point is higher than the threshold valid value, the processor 114 determines that the corresponding current predicted 3D pose corresponding to the body part J1 of the current time point is valid. On the other hand, if the current sub valid value of the body part J1 of the current time point is not higher than the threshold valid value, the processor 114 determines that the corresponding current predicted 3D pose corresponding to the body part J1 is not valid and is rejected.

In some embodiments, the threshold value is set by a user or is determined by the processor 114.

In some embodiments, the validate network as mentioned above also determines whether each of the body parts or each of the body parts are valid or not according to the current sub valid value.

In some embodiments, the corresponding current predicted 3D pose of the current time point and the confidence embedding of the current time point of each of the body parts are outputted to a main tracking device after the validation of the body parts are determined.

In some embodiments, if a body part is determined to be rejected, the corresponding current predicted 3D pose of the current time point is masked by the processor 114 as illustrated in FIG. 2.

Figure 6:
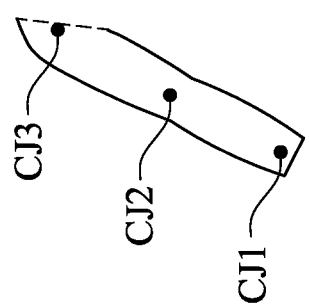
FIG. 6 is a schematic diagram illustrating a masked current predicted 3D pose of the current time point according to some embodiments of the present disclosure.

Reference is made to FIG. 6. FIG. 6 is a schematic diagram illustrating a masked current predicted 3D pose 600 of the current time point according to some embodiments of the present disclosure. For example, if only the body parts J1 to J3 are determined to be valid, the corresponding current predicted 3D poses of the other body parts J4 to J15 are masked.

Reference is made to FIG. 1 again. In some embodiments, if the tracking device 110A is the main tracking device, the tracking device 110A receives the masked current predicted 3D poses generated by the other tracking devices 110B to 110D and the confidence of the human body or the confidence values/confidence embedding from the other tracking device 110B to 110D. It should be noted that, each of the other tracking devices 110B to 110D generates their own masked current predicted 3D poses.

In some embodiments, whether the part of the current predicted 3D pose of the current time point is masked or not is operated by the main tracking device 110A. For example, the tracking device 110D sends the current predicted 3D pose and the confidence embedding of the body parts J1 to J15 to the main tracking device 110A, and the main tracking device 110A masks part of the current predicted 3D pose transmitted from the tracking device 110D according to the received confidence embedding of the body parts J1 to J15.

That is, the main tracking device 110A generates a masked current predicted 3D pose corresponding to the tracking device 110B according to the current predicted 3D pose and the confidence received from the tracking device 110B. The main tracking device 110A generates a masked current predicted 3D pose corresponding to the tracking device 110C according to the current predicted 3D pose and the confidence received from the tracking device 110C. The main tracking device 110A generates a masked current predicted 3D pose corresponding to the tracking device 110D according to the current predicted 3D pose and the confidence received from the tracking device 110D.

The main tracking device 110A generates the current final optimized pose of the current time point according to the masked current predicted 3D poses of the other tracking devices 110B to 110D. In some embodiments, the main tracking device 110A generates the current final optimized pose of the current time point by merging the masked current predicted 3D poses of the tracking devices 110A to 110D.

Figure 7:
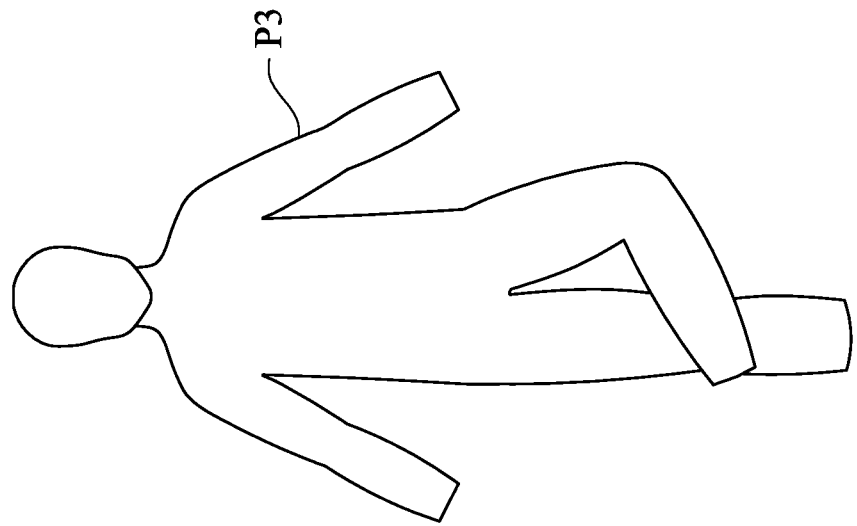
FIG. 7 is a schematic diagram illustrating a final optimized pose of the current time point according to some embodiments of the present disclosure.

Reference is made to FIG. 7. FIG. 7 is a schematic diagram illustrating a current final optimized pose 700 of the current time point according to some embodiments of the present disclosure. The current final optimized pose 700 is a 3D pose image.

In some embodiments, the memory 116A of the tracking device 110A stores an attention-based aggregate network. The processor 114A of the main tracking device 110A inputs the masked current predicted 3D poses of the current time point and the confidence of the current time point received from other tracking devices 110B to 110D and the masked current predicted 3D pose generated by the tracking device 110A into the attention-based aggregate network to generate the final optimized pose of the current time point.

In some embodiments, the attention-based aggregate network is an artificial neural network, which is a computing system or algorithm. Various network algorithms may be applied to the attention-based aggregate network in the embodiments of the present disclosure.

In some embodiments, the processor 114A of the main tracking device 110A transforms the coordinate of the current predicted 3D poses of the current time point received from other tracking devices 110B to 110D into the coordinate of the main tracking device 110A before masking the current predicted 3D poses of the current time point received or before generating the current optimized pose of the current time point.

In some embodiments, the main tracking device 110A transforms the current final optimized pose 700 as illustrated in FIG. 7 of the current time point to the head-mounted display devices 130A to 130C, and the head-mounted display devices 130A to 130C display the current final optimized pose 700 for the users P1 to P3.

In some embodiments, before transforming the current final optimized pose 700 to the head-mounted display devices 130A to 130C, the main tracking device 110A aligns the tracking space of each of the head-mounted display devices 130A to 130C and get the device status of each of the head-mounted display devices 130A to 130C, so as to adjust the current final optimized pose 700 displayed by the head-mounted display devices 130A to 130C according to the alignment and the device status of each of the head-mounted display devices 130A to 130C.

In some embodiments, the memory 116D of the tracking device 110D stores the current final optimized pose of the time point T1 generated by the main tracking device 110A. In some embodiments, the memory 116D of the tracking device 110D stores the current predicted 3D pose of the time point T1. The current predicted 3D pose of the time point T1 is used as the previous predicted 3D pose of the previous time point of the time point T2, and the current final optimized pose of the time point T1 is used as the previous final optimized of the of the previous time point of the time point T2.

In some embodiments, the virtual reality system 100 as illustrated in FIG. 1 obtains the current final optimized pose of the users P1 to P3 together.

The embodiments of the present disclosure provide a virtual reality system, a control method, and a non-transitory computer readable storage medium, through the communication and cooperation among several tracking devices, the current final optimized human pose is generated according to the prediction of each body part from the several tracking devices with different positions or angles. Furthermore, since the previous predicted 3D pose of the human body of the previous time point and the previous final optimized pose of the human body of the previous time point are considered when generating the current final optimized pose of the current time point, the prediction result of human pose is more accurate.

In some embodiments, the memory 116 can be a flash memory, a HDD, a SSD (Solid State Disk), a DRAM (Dynamic Random Access Memory) or a SRAM (Static Random-Access Memory). In some embodiments, the memory 116 can be a non-transitory computer readable medium stored with at least one instruction associated with a control method. The at least one instruction can be accessed and executed by the processor 114.

In some embodiments, the processor 114 can be, but is not limited to being, a single processor or an integration of multiple microprocessors such as CPUs or GPUs. The microprocessors are electrically coupled to the memory 116 in order to access the at least one instruction. According to the at least one instruction, the above-mentioned control method can be performed.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A virtual reality system, comprising: a head-mounted display; a main visual tracking device, communicated with the head-mounted display, comprising a main camera and a main processor; a plurality of visual tracking devices, communicated with the main visual tracking device, each comprising: a camera, configured to obtain a picture of a human body of a current time point; and a processor, coupled to the camera, configured to: obtain a current predicted 3D pose of the human body of the current time point and a confidence of the current time point of the human body according to the picture; determine a previous valid value of the human body according to a previous predicted 3D pose of the human body of a previous time point and a previous final optimized pose of the human body of the previous time point; determine a current valid value of the human body according to the previous valid value, the confidence of the current time point, and the current predicted 3D pose of the current time point; and output the current predicted 3D pose of the current time point and the confidence of the current time point of the human body to the main visual tracking device according to the current valid value, so as to generate a current final optimized pose of the current time point for the head-mounted display to display the current final optimized pose of the current time point; wherein the main processor of the main visual tracking device is further configured to: generate the current final optimized pose of the current time point according to the current predicted 3D pose of the current time point and the confidence of the current time point of the human body obtained from each of the tracking devices.

2. The virtual reality system of claim 1, wherein each of the plurality of visual tracking devices further comprises:
a memory, configured to store the current predicted 3D pose of the current time point.

3. The virtual reality system of claim 1, wherein each of the plurality of visual tracking devices further comprises:
a memory, configured to store a pose estimation network;
wherein the processor is further configured to input the picture of the human body into the pose estimation network so as to generate the current predicted 3D pose of the current time point and the confidence of the current time point.

4. The virtual reality system of claim 1, wherein the human body comprises a plurality of body parts, and each of the plurality of body parts corresponds to a corresponding current predicted 3D pose of the current time point, a corresponding previous predicted 3D pose of the previous time point, and a corresponding previous final optimized pose of the previous time point.

5. The virtual reality system of claim 4, wherein the processor is further configured to:
for each of the plurality of body parts, obtain a confidence embedding of the current time point according to the picture;
for each of the plurality of body parts, determine a previous sub valid value according to the corresponding previous predicted 3D pose and the corresponding previous final optimized pose;
for each of the plurality of body parts, determine a current sub valid value according to the previous sub valid value, the confidence embedding, and the corresponding current predicted 3D pose; and
for each of the plurality of body parts, output the corresponding current predicted 3D pose and the confidence embedding to the main visual tracking device according to the current sub valid value, so as to generate a corresponding current final optimized pose of the current time point.

6. The virtual reality system of claim 5, wherein the plurality of body parts comprise a first body part, if a first current sub valid value of the first body part is higher than a threshold valid value, the main processor of the main visual tracking device is further configured to determine that a first corresponding current predicted 3D pose of the first body part is valid.

7. The virtual reality system of claim 6, wherein the main processor of the main visual tracking device is further configured to mask the first corresponding current predicted 3D pose if it is determined that the first corresponding current predicted 3D pose is not valid.

8. The virtual reality system of claim 1, wherein the main visual tracking device further comprises:
a memory, configured to store an attention-based aggregate network;
wherein the main processor of the main visual tracking device is further configured to input the current predicted 3D pose and the confidence received from another visual tracking device of the plurality of visual tracking devices to the attention-based aggregate network, so as to generate the current final optimized pose.

9. The virtual reality system of claim 8, wherein the main processor of the main visual tracking device is further configured to transform a coordinate of the current predicted 3D pose received from the another visual tracking device to a coordinate of the main visual tracking device.

10. A control method, suitable for a virtual reality system comprising a head-mounted display, a main visual tracking device, and a plurality of visual tracking devices, the main visual tracking device comprises a main camera and a main processor, and each of the plurality of visual tracking devices comprising a camera and a processor, the control method comprising:
obtaining a picture of a human body of a current time point by the camera;
obtaining a current predicted 3D pose of the human body of the current time point and a confidence of the current time point of the human body according to the picture by the processor;
determining a previous valid value of the human body according to a previous predicted 3D pose of the human body of a previous time point and a previous final optimized pose of the human body of the previous time point by the processor;
determining a current valid value of the human body according to the previous valid value, the confidence of the current time point, and the current predicted 3D pose of the current time point by the processor;
outputting the current predicted 3D pose of the current time point and the confidence of the current time point of the human body to the main visual tracking device by the processor according to the current valid value, so as to generate a current final optimized pose of the current time point for the head-mounted display to display the current final optimized pose of the current time point; and
generating, by the main processor of the main visual tracking device, the current final optimized pose of the current time point according to the current predicted 3D pose of the current time point and the confidence of the current time point of the human body obtained from each of the tracking devices.

11. The control method of claim 10, each of the plurality of visual tracking devices comprising a memory, the control method further comprising:
storing the current predicted 3D pose of the current time point by the memory.

12. The control method of claim 10, each of the plurality of visual tracking devices comprising a memory, the control method further comprising:
storing a pose estimation network by the memory; and
inputting the picture of the human body into the pose estimation network so as to generate the current predicted 3D pose of the current time point and the confidence of the current time point by the processor.

13. The control method of claim 10, wherein the human body comprises a plurality of body parts, and each of the plurality of body parts corresponds to a corresponding current predicted 3D pose of the current time point, a corresponding previous predicted 3D pose of the previous time point, and a corresponding previous final optimized pose of the previous time point.

14. The control method of claim 13, further comprising:
for each of the plurality of body parts, obtaining a confidence embedding of the current time point according to the picture;
for each of the plurality of body parts, determining a previous sub valid value according to the corresponding previous predicted 3D pose and the corresponding previous final optimized pose;
for each of the plurality of body parts, determining a current sub valid value according to the previous sub valid value, the confidence embedding, and the corresponding current predicted 3D pose; and
for each of the plurality of body parts, outputting the corresponding current predicted 3D pose and the confidence embedding to the main visual tracking device according to the current sub valid value, so as to generate a corresponding current final optimized pose of the current time point.

15. The control method of claim 14, wherein the plurality of body parts comprise a first body part, wherein the control method further comprises:
   determining that a first corresponding current predicted 3D pose of the first body part is valid by the main processor of the main visual tracking device if a first current sub valid value of the first body part is higher than a threshold valid value.

16. The control method of claim 15, further comprising:
   masking the first corresponding current predicted 3D pose if it is determined that the first corresponding current predicted 3D pose is not valid by the main processor of the main visual tracking device.

17. The control method of claim 10, wherein the main visual tracking device further comprises a main memory, the control method further comprises:
   storing an attention-based aggregate network by the main memory; and
   inputting the current predicted 3D pose and the confidence received from another visual tracking device of the plurality of visual tracking devices to the attention-based aggregate network by the main processor of the main visual tracking device, so as to generate the current final optimized pose.

18. The control method of claim 17, further comprising:
   transforming a coordinate of the current predicted 3D pose received from the another visual tracking device to a coordinate of the main visual tracking device by the main processor of the main visual tracking device.

19. A non-transitory computer readable storage medium with a computer program to execute a control method, wherein the control method comprises:
   obtaining a current predicted 3D pose of a human body of a current time point and a confidence of the current time point of the human body according to a picture of the human body of the current time point obtained by a camera by a processor of a first visual tracking device;
   determining a previous valid value of the human body according to a previous predicted 3D pose of the human body of a previous time point and a previous final optimized pose of the human body of the previous time point by the processor of the first visual tracking device;
   determining a current valid value of the human body according to the previous valid value, the confidence of the current time point, and the current predicted 3D pose of the current time point by the processor of the first visual tracking device; and
   outputting the current predicted 3D pose of the current time point and the confidence of the current time point to a second visual tracking device by the processor of the first visual tracking device according to the current valid value, so as to generate a current final optimized pose of the current time point for a head-mounted display to display the current final optimized pose of the current time point; and
   generating, by the second visual tracking device, the current final optimized pose of the current time point according to the current predicted 3D pose of the current time point and the confidence of the current time point of the human body obtained from each of the tracking devices.

20. The non-transitory computer readable storage medium of claim 19, wherein the human body comprises a plurality of body parts, and each of the plurality of body parts corresponds to a corresponding current predicted 3D pose of the current time point, a corresponding previous predicted 3D pose of the previous time point, and a corresponding previous final optimized pose of the previous time point, wherein the control method further comprises:
   for each of the plurality of body parts, obtain a confidence embedding of the current time point according to the picture by the processor of the first visual tracking device;
   for each of the plurality of body parts, determine a previous sub valid value according to the corresponding previous predicted 3D pose and the corresponding previous final optimized pose by the processor of the first visual tracking device;
   for each of the plurality of body parts, determine a current sub valid value according to the previous sub valid value, the confidence embedding, and the corresponding current predicted 3D pose by the processor of the first visual tracking device; and
   for each of the plurality of body parts, output the corresponding current predicted 3D pose and the confidence embedding to the second visual tracking device according to the current sub valid value by the processor of the first visual tracking device, so as to generate a corresponding current final optimized pose of the current time point.

* * * * *